(12) United States Patent
Wood et al.

(10) Patent No.: US 6,167,913 B1
(45) Date of Patent: Jan. 2, 2001

(54) PIPE LINER, A LINER PRODUCT AND METHODS FOR FORMING AND INSTALLING THE LINER

(75) Inventors: Peter Trevor William Wood, West Yorkshire; Michael Leopold Erictschudi Broadwood, East Sussex; Geoffrey David Hopkins, Surrey; Edward John Cirket, Essex, all of (GB)

(73) Assignee: Cempipe Ltd. (GB)

( * ) Notice: Under 35 U.S.C. 154(b), the term of this patent shall be extended for 0 days.

(21) Appl. No.: 09/231,355

(22) Filed: Jan. 13, 1999

(51) Int. Cl.$^7$ ............................................. F16L 55/18
(52) U.S. Cl. ........................ 138/98; 138/97; 264/269; 405/150.1
(58) Field of Search ..................... 138/98, 97; 156/94, 156/294, 293; 264/36, 267, 270; 405/150.1

(56) References Cited

U.S. PATENT DOCUMENTS

| | | | |
|---|---|---|---|
| 4,325,772 | 4/1982 | Suethoshi et al. | 156/294 |
| 5,034,180 | 7/1991 | Steketee, Jr. | 264/516 |
| 5,101,863 | * 4/1992 | Fujii et al. | 138/98 |
| 5,385,173 | * 1/1995 | Gargiulo | 138/98 |
| 5,427,154 | * 6/1995 | Stephens | 138/98 |
| 5,487,411 | * 1/1996 | Goncalves | 138/98 |
| 5,580,406 | * 12/1996 | O'ffill | 138/98 X |
| 5,634,743 | * 6/1997 | Chandler | 138/98 X |
| 5,762,450 | 6/1998 | Schmager | 405/154 |
| 5,791,378 | * 8/1998 | Stephens | 138/98 |
| 5,971,030 | * 10/1999 | Maimets | 138/98 |

FOREIGN PATENT DOCUMENTS

| | | |
|---|---|---|
| 1039836 | 8/1966 | (AU) . |
| WO 87/03840 | 7/1987 | (EP) ............... B29C 27/16 |
| 2302153 | 1/1997 | (GB) . |

* cited by examiner

Primary Examiner—Patrick Brinson
(74) Attorney, Agent, or Firm—Zarley, McKee, Thomte, Voorhees & Sease

(57) ABSTRACT

A method for lining, rehabilitating, repairing, and rejuvenating pipelines and passageways is disclosed. The method comprises the steps of hauling a tubular liner into a section of pipeline to be repaired, disposing a reforming member within the liner at one end proximate one end of the pipeline, depositing a cement slug in the host pipeline proximate the said one end, and expanding the liner within the pipeline against the inner surface of the said pipeline by urging the reforming member along within the liner under pressure. The outer surface of the liner is provided with a plurality of protrusions in the form of grout anchor hooks which penetrate the cement along the length of the said liner thus ensuring a mechanical bond between said liner and said cement. The cement also adheres to the inner surface of the pipeline and thus a rigid, secure, water impermeable lining construction is achieved. The anchor hooks both prevent gravitational slump of the mortar, and also ensure that the liner does not fall from the cement. A substantially uniform thickness of cement is obtained, and the lining constructions adopts a substantially identical shape to that of the host pipe after the cement has hydrated.

17 Claims, 6 Drawing Sheets

PIPE LINER, A LINER PRODUCT AND METHODS FOR FORMING AND INSTALLING THE LINER

TECHNICAL FIELD

This invention relates to thermoplastic liners for lining cylindrical or tubular pipe lines, either initially or as a repair, for protecting the pipe lines, particularly pressure pipe lines, from deterioration and preventing the pipe lines from leaking and particularly relates to a novel and unique pipe liner having a profile on one side which serves as an anchor for mechanical bonding to a cementitious substrate and a generally folded cross-sectional configuration to facilitate insertion within a pipeline and which liner is inflatable or expandable into a cylindrical or tubular configuration to line the pipe. The invention also relates to methods of forming the pipe liner from a continuously extruded flat sheet material into a cylindrical or tubular shaped thermoplastic liner by spirally winding the sheet material and bonding the overlapping joints, either as single liners or multiple liners.

BACKGROUND

Large sums of money are spent annually on water mains refurbishment, however this has been directed at water quality rather than leakage control. The problem is really twofold, namely corrosion and leakage control. Ideally therefore, the refurbishment solution should offer both corrosion protection to the existing host pipe as well as affording a high level of leakage control. The available refurbishment options do not address both problems. It is a fact that all water distribution systems leak. Leakage can be at the joints or through the pipe structure itself where internal pitting causes pinholes and subsequently accelerated external corrosion of the pipe walls. The majority of water mains installed prior to the mid 1960's were cast iron pipes which were either unprotected or were treated with a bituminous coating which has not proven to be an effective long term corrosion treatment resulting in problems such as:

1. Leakage due to faulty joints.
2. Internal metallic corrosion leading to failure of the pipe itself as a result of leakage or loss of hydraulic capacity owing to build-up of corrosion products.
3. Internal corrosion due to microbial growths results in bacterial oxidation of ferrous iron, especially at low pH values with biological factors producing periodic concentrations of iron as high as 8 mg/L.

Currently, there are a substantial number of various apparatus and methods for lining pipe lines that involve forming a cylindrical thermoplastic liner into a reduced cross-section such that the liner can be inserted into and moved through a pipe to be lined and subsequently expanded into a cylindrical configuration approximating the diameter of the pipe to be lined whereby the thermoplastic material forms the interior surface of the pipe for transporting fluid or other material through the pipe. One such method for protecting the interior of pipe lines is disclosed in French Patent No 81 07346 to Laurent in the patent, there is disclosed a cylindrical liner formed of a thermoplastic material having historic time-memory properties, ie, shape-memory characteristics. That is the liner is initially formed in a cylindrical configuration and is then folded at an appropriate temperature to reduce the cross-section off the liner, enabling introduction of the folded liner into the pipe to be lined. The folded liner in the pipe is then expanded by the introduction of pressurised hot fluid, eg steam, and at a temperature such that the folded liner assumes its original shape or the shape given to it by the host pipe. With the applied steam pressure the liner conforms to the interior contour of the pipe.

There are various types of liners relating to the application of the shape-memory characteristics of thermoplastic materials where the liners are folded for subsequent reformation or expansion within a generally cylindrical shaped pipe or conduit to provide a lined pipe. Other types of thermoplastic liners are also known. For example, in British Patent Specification 1580438, as well as in PCT application PCT/AU86/00362, WO87/03840, there are disclosed liners having generally U-shaped configurations (an X-configuration being further shown in British Patent No 1,580,438). In British Patent Application No 2,084,686 an oversized round semi-rigid plastic tube is flattened or otherwise reduced in cross-sectional area at the job site and then inserted cold and semi-rigid into the existing host pipe whereupon it is expanded against the host pipe using internal pressure and heat. All of the liners of these documents employ semi-rigid material in cylindrical form which is forcibly mechanically collapsed or folded by creating longitudinal depressions along the pipe liner material and maintaining this profile by means of strapping. Later, when the folded liner is installed in a pipe, the strapping is released such that the folded liner returns to its original cylindrical configuration thus creating a liner in the host pipe.

In U.S. Pat. No. 5,034,180 there is disclosed a method for installing a liner of plastic material in a pipe. In that patent, a thin flexible tubular membrane providing a heat containment tube is first inserted into an underground pipe to be repaired. The thermally folded liner is then inserted into the tube while the liner is heated and flexible. Hot steam is then injected into the liner and the tube to heat the liner along its entire length externally and internally whereupon pressure is applied to expand the liner against the walls of the pipe with a flexible tubular membrane therebetween.

All of these known methods fold or deform or mechanically collapse the generally cylindrical thermoplastic liners into a reduced cross-sectional shape enabling the liner for insertion into the pipe being lined. The thermoplastic liners use the shape-memory characteristics both in manufacturing the liner as well as in the reformation process to reconstitute the liner to its cylindrical configuration. The mechanically deformed liners rely on a manufacturing process which introduces substantial stress into the liner and which inhibits the formation of liners for lining large diameter pipes and restricts the wall thickness of the liners. In many instances the reliability of the lined pipe is adversely affected. Many of the stresses introduced into the liners during manufacture are often difficult to relieve upon installation. Flat spots and loose fitting liners often occur as a result of inadequate relief of the stresses, especially at the point on the liner where the concave peak formed during the deforming yields the highest magnitude of residual stresses. The nature of the materials prohibit the lining of bends, large diameters and very long lining lengths. Also, all of these liners do not provide any active corrosion prevention of the host pipe, which is generally a metal such as steel, ductile iron or cast iron, thus residual corrosion of the host pipe is free to continue and as the liners are designed to function with structural enhancement from the host pipe, the premature failure of the host pipe will result in the failure of the lining as the lining will have nothing suitably strong enough to line.

While the above refers to semi-rigid or semi-flexible linings, there are also used methods of lining pressure pipes with flexible linings. In such processes a flexible liner is fixed to the walls of a host pipe by means of an adhesive. As the adhesive is placed between the lining and the internal walls of the host pipe and this adhesive either cures at ambient temperatures, when the adhesive contains volatile components, or two part component adhesives are used which are free of volatile. In this case the adhesive setting and hardening is promoted by the use of heating during installation of the liner. Also, there are methods which require the impregnation of coated needle felt fabrics with thermosetting resins and by using inversion techniques, the uncured resin impregnated tubes are inserted into the pipe to be lined and thereupon cured by means of heat using either steam or hot water. Various patents relate to these method sometimes referred to as 'cured-in-place'. Such patents include, U.S. Pat. Nos. 3,927,164 and 4,064,211 in which a flexible tube is turned inside out as it is inflated and blown into a pipeline section from one end of the section. Similarly Japan Patent No 55-19569, British Patent No 957,929, U.S. Pat. Nos. 3,927,184, 2,794,785, 3,132,062, 3,230,129 and 3,494,813 and British Patent Nos. 1,002,131, 1,069,623 and 1,025,011 all refer to lining with a flexible hose which is inverted into a pipe while turning the tube inside out by the action of a pressurising fluid such as water or compressed air and bonded at the same time onto the inner surface of the host pipe. IPN WO 97/04269 Connor and Wilde refers to lining pressure pipes using ultra-thin thermoplastic tubes adhered to the walls of the host pipe to be lined. This Application shows in its methodology to be difficult to achieve especially where one is looking for a reliable lining which can stand the test of time and the interfacial adhesion of the various components relies purely upon chemical bonding. Thickness control and a reliable distribution of the adhesive are not addressed in the application.

Further disclosures of prior art methods can be found in U.S. Pat. No. 5,487,411 to Gonclaves, U.S. Pat. No. 5,634,743 to Chandler, U.S. Pat. No. 5,101,863 to Fujii et al., U.S. Pat. No. 5,971,030 to Maimets, and U.S. Pat. No. 5,427,154 and U.S. Pat. No. 5,791,378 both to Stephens.

Of particular interest to the present invention are U.S. Pat. No. 5,580,406 to O'ffill which discloses the use of a tubular resilient plastics liner having a plurality of ribs extending parallel to the axis of the liner tube for the rehabilitation of pipelines. In use, a resinous thixotropic carrier material is applied to the surface of the pipeline to be rehabilitated, and the liner is pressed into the carriers with the ribs contacting the carrier material first. The ribs embed within the carrier and the liner is retained therein be virtue of the mechanical lock between the ribs and carrier material after curing thereof.

Also, U.S. Pat. No. 5,487,411 to Gonclaves discloses the use of a dual-layered liner which is drawn into a pipeline folded in a U-shape configuration. The liner is subsequently heated which causes one of the layers of the liner to become sufficiently pliable to allow the cross-section shape and size of the liner pipe to conform to the inner cross-section shape and size of a host pipe.

All of the above systems are very expensive as they require the use of special equipment, extensive heating to cure either adhesives, thermosetting resins or the liner itself, all of which are expensive materials and are therefore limited in their application especially as they are generally not suitable for use on drinking applications because of the nature of the chemicals used in the processes.

There are also techniques for the lining of drinking water pipe lines which use on site spray techniques. These are cement mortar lining, which has been used by the industry for nearly 100 years and epoxy spray solutions. In both methods a centrifugal spray head is winched through the pipe applying the lining materials as it proceeds from one end of the host pipe to the other end. Cement mortar lining is well known to the industry and on its own has a very successful installation track record however, there are short comings in cement mortar applied on its own, not least of all is calcium depletion over time (particularly in soft water supplies) and the unacceptably high pH levels encountered after initial installation.

There are systems for applying the epoxy resin by means of propelling special paint PIGS (precise internal gauge devices) through the host pipe and depositing the epoxy lining as the PIG progresses through the host pipe. In all cases water quality is the main criteria and these systems do not offer leakage prevention. Depending upon the nature of the water (acidic, alkaline, corrosive, abrasive) or pipeline contents, the use of cement or epoxy may be unsatisfactory because the pipeline contents may cause depletion of the lining materials with the passage of time with a resultant increased risk of failure. If such failures should occur, the contents of the pipeline will escape or become contaminated, especially where the pipeline is under pressure.

Most of the known methods of altering the diameter of a thermoplastic liner in order to insert it into a pipe operate within the plastic range of strain in order to use the plastic memory of the liner thus requiring the application of heat or high pressure or combination thereof to expand the liners into a given host pipe within a reasonable amount of time. These all present installation difficulties and narrow the technical envelope of the systems whilst becoming much more expensive as the diameter increases.

All of the known methods for lining metal pressure pipes do not offer active corrosion protection, water quality control and leak prevention.

It is the object of the invention to provide a liner for and method of lining pipelines, passageways and the like which neither relies on the plastic memory properties of the liner itself, yet provides a secure bond between the liner, and intermediate adhesive compound and the internal surface of the pipeline to be lined.

It is a further object of the invention to provide a liner which mitigates against the slump of an intermediate compound used between the liner and the internal surface of the pipeline and thus ensures even lining of the said pipeline.

It is a yet further object of this invention to provide a method of lining pipelines which is simple and results in a uniform lining which conforms substantially to the contours of the internal surface of the pipeline being lined.

It is a still further object of the invention to provide a method of lining a pipeline which provides active corrosion protection, water quality control and leak prevention for the pipeline once lined.

DISCLOSURE OF THE INVENTION

According to the invention there is provided a method of lining a host pipeline or passageway or the like, comprising the steps of drawing into a portion of said pipeline a liner of sufficient length to line said portion and depositing a slug of a fluent hardenable compound in the host pipeline externally of the liner, characterised in that the liner is expanded within the pipeline against the inner surface of the said pipeline progressively along the length of the said liner thus causing the slug of fluent hardenable compound to flow between the outer surface of the liner and the inner surface of the pipeline and progressively along the pipe.

Preferably, the outer surface of the liner is provided with a plurality of protrusions which penetrate the curable hardenable compound as it flows therearound to form a mechanical bond therewith when the compound cures.

Preferably the liner is tubular, of substantially similar cross-section shape and dimension to that of the pipeline, and most preferably drawn into the pipeline in folded U-shaped form.

Preferably the liner is inflated inside the pipeline thus causing the fluent curable compound to flow between the outer surface of the liner and the inner surface of the host pipeline.

Preferably the fluent curable compound is a cementitious mortar, or grout, but may also be a polymer adhesive, curable resin, or other suitable curable compound.

Preferably the liner is formed from a polymer material, such as polyethylene, which may be additionally thermoplastic, but ideally the liner will be thin walled, typically of the order of 1–2 mm, excluding the thickness of the protrusions.

Preferably the liner is provided with a plurality of upturned anchor formations joined at their single end to the outer surface of the liner and having their split or double end standing free and proud above the said liner outer surface. A number of different protrusion formations may however be used, such as spines, spikes, tangs, arrowheads, tines and the like.

Preferably the protrusions are substantially uniformly distributed over the outer surface of the liner and provided thereon in a concentration which substantially prevents the natural gravitational slump of fluent curable compound which naturally occurs.

Preferably the lining of the pipeline is effected in a trenchless manner.

Further preferably the thickness of the fluent curable compound between the outer surface of the liner and the inner surface of the host pipeline varies slightly over the portion of the host pipeline being lined.

Further preferably the thickness of the fluent curable material between the outer surface of the liner and the inner surface of the host pipeline as the liner is urged outwardly against the inner surface of the pipeline is controlled to some degree by the length of the protrusions.

According to a second aspect of the invention there is provided a liner for lining a host pipeline, said liner being extruded in a plastics or polymer material, characterised in that one surface of the liner is provided with a plurality of spaced protrusions around and within which a fluent compound can flow.

Preferably the liner is spirally wound around a former and heat sealing of the seams between adjacent liner after spiral winding thereof portions is effected.

Preferably the liner in its tubular and generally cylindrical formation is then folded into a non-cylindrical shape, such as a U-shape to facilitate the drawing of the liner within the pipeline.

Preferably wrapping tapes maintain the non-cylindrical shape of the liner, although string ties, or straps may be used.

Henceforth not only is the pipeline rehabilitated as the fluent curable compound cures therein, but said compound also ensures that the liner is held in place, and thus effective lining of the pipeline is also achieved.

A specific embodiment of the invention is now described by way of example with reference to the accompanying schematic drawings.

A description of the manufacture of the liner is firstly provided.

Figure 1C:
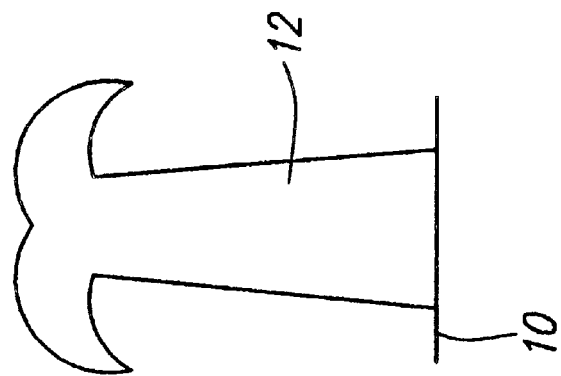
FIGS. 1a, 1b, 1c show a cross-sectional view of a pipe lined using this invention, an enlarged section of said pipe, and an upturned anchor protrusion of the type provided on one surface of the liner.

Referring to FIG. 1c, a thermoplastic membrane 10 is manufactured by a continuous forming moulding process with grout anchor hooks 12 on one surface. It is to be appreciated that FIG. 1c shows only a single grout anchor isolated on a very small portion of liner material, and that the liner thus formed will be densely populated on one surface with a plurality of such hooks. The thickness of the flat material may be less than 0.1 mm or greater than 1 mm but generally will be 0.2 mm and the length of the grout anchor hooks can vary from 1 mm to 6 mm but generally will be approximately 3 mm. The configuration, shape and size of the grout anchor hooks can be engineered to meet performance requirements. This material is then either spirally wound into a discrete continuous length of cylindrical and tubular shape having a diameter approximating to that of the host pipe less an allowance for the thicknesses of cement disposed on either side of that diameter, with heat fused, laser or ultrasonically welded seams or formed into a discrete continuous length of cylindrical and tubular shape having a predetermined diameter with a heat fused, laser or ultrasonically welded longitudinal seam.

This thermoplastic membrane tube is then folded from an initial cylindrical cross-section having a predetermined diameter which may be of the order of 50 mm up to 2000 mm, to the non-cylindrical cross-sectional shape having a dimension in any cross-sectional direction less than the predetermined diameter of the liner, i.e. of the order of 40% to 55% reduction. The folding process can be easily achieved by hauling the tubular liner through a forming tool or simply rolling the liner up along its length whereupon the folded tube is then held in that configuration by means of taping or banding. As the material is comparatively thin and displays elastomeric properties, the folding process does not rely on the shape-memory characteristics of the material as disclosed in some of the prior art documents identified above. The tubes thus formed are then coiled or stacked horizontally to be used at a later time at the site of installation.

Figure 1B:
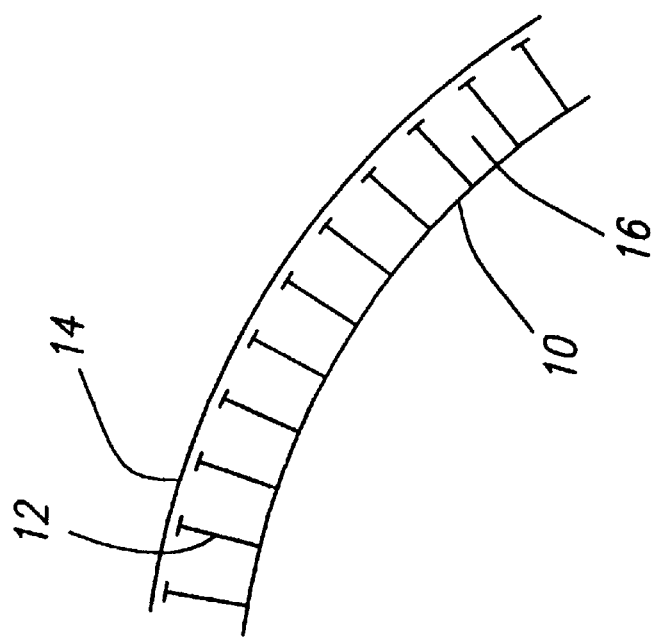
Figure 1A:
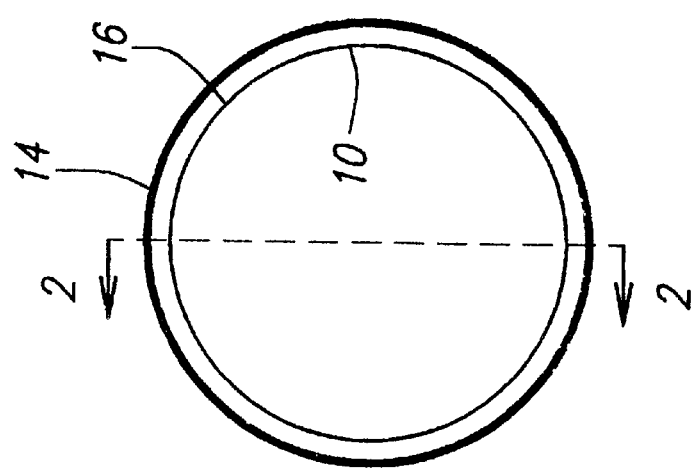
Figure 2:
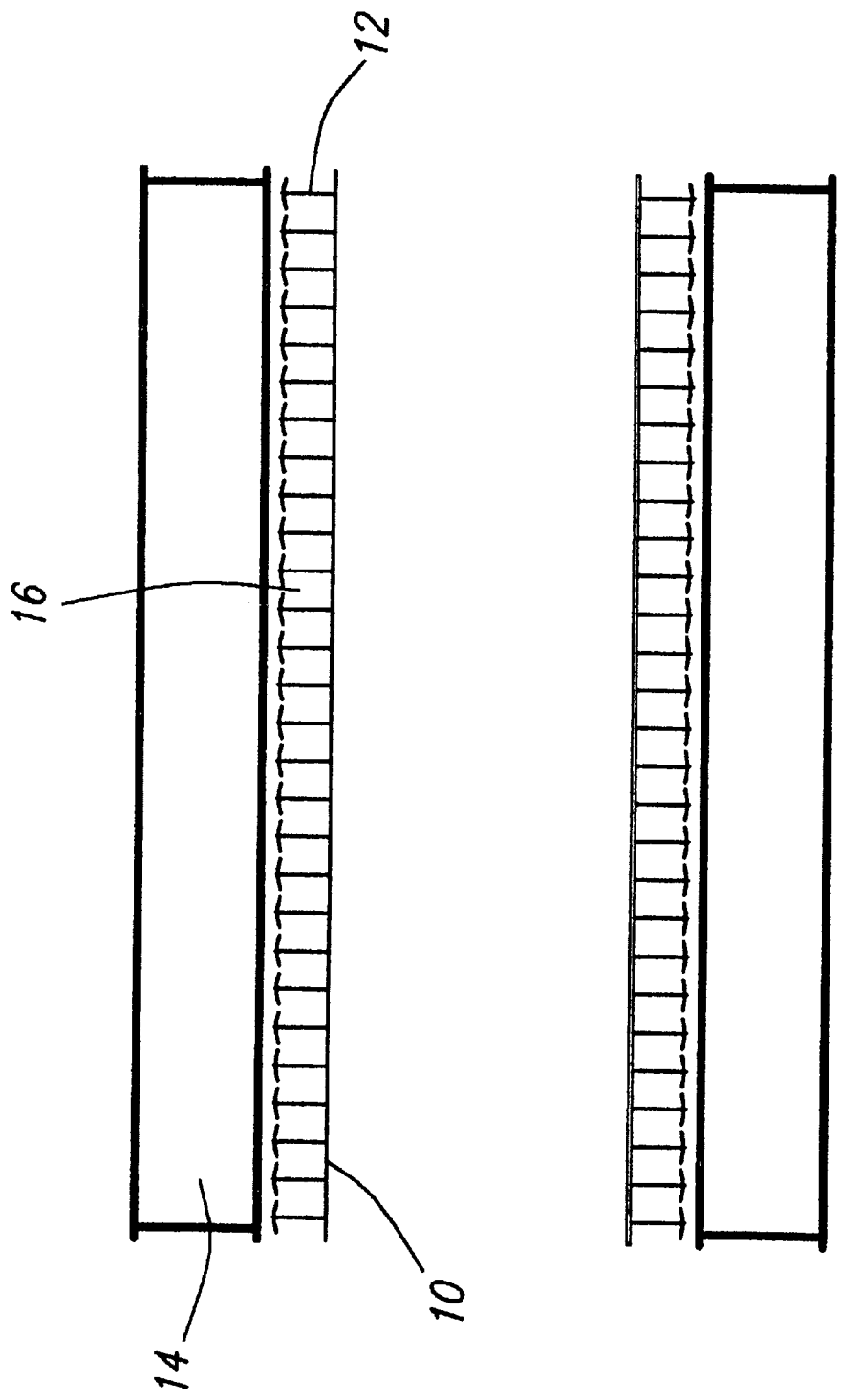
FIG. 2 is a section view of the pipe of FIG. 1a along 2—2.

Referring to FIGS. 1a, b, c, there is shown a lined host pipe 14 to which a liner 10 is adhered by means of a cement 16. As can be seen from FIG. 1b, the cement 16 has been penetrated throughout by a plurality of anchor hooks 12 formed on the outer surface of the liner 10, and furthermore the cement contacts the inner surface of the host pipe 14 uniformly and without interruption. This particular construction both ensures that the liner 10 does not fall inwardly of the pipe after lining, and also that a firm and secure bond is formed between the cement and the inner surface of the host pipe 14.

The installation principle is based upon the progressive "re-rounding" or inflating of a folded and formed thermoplastic liner with a measured quantity of a cement mortar disposed externally of the liner. The thermoplastic liner ultimately becomes mechanically adhered to the cement with the cement being placed inside the host pipe concurrent with the re-rounding of the liner. The dimensions of the protruding grout anchor hooks 12 on the cement facing surface of the liner provide a means of controlling the gravitational slump of cement which would naturally occur and give the lining its ultimate design thickness. The thermoplastic liner must also be strong enough to sustain the traumas of installation.

Figure 3:
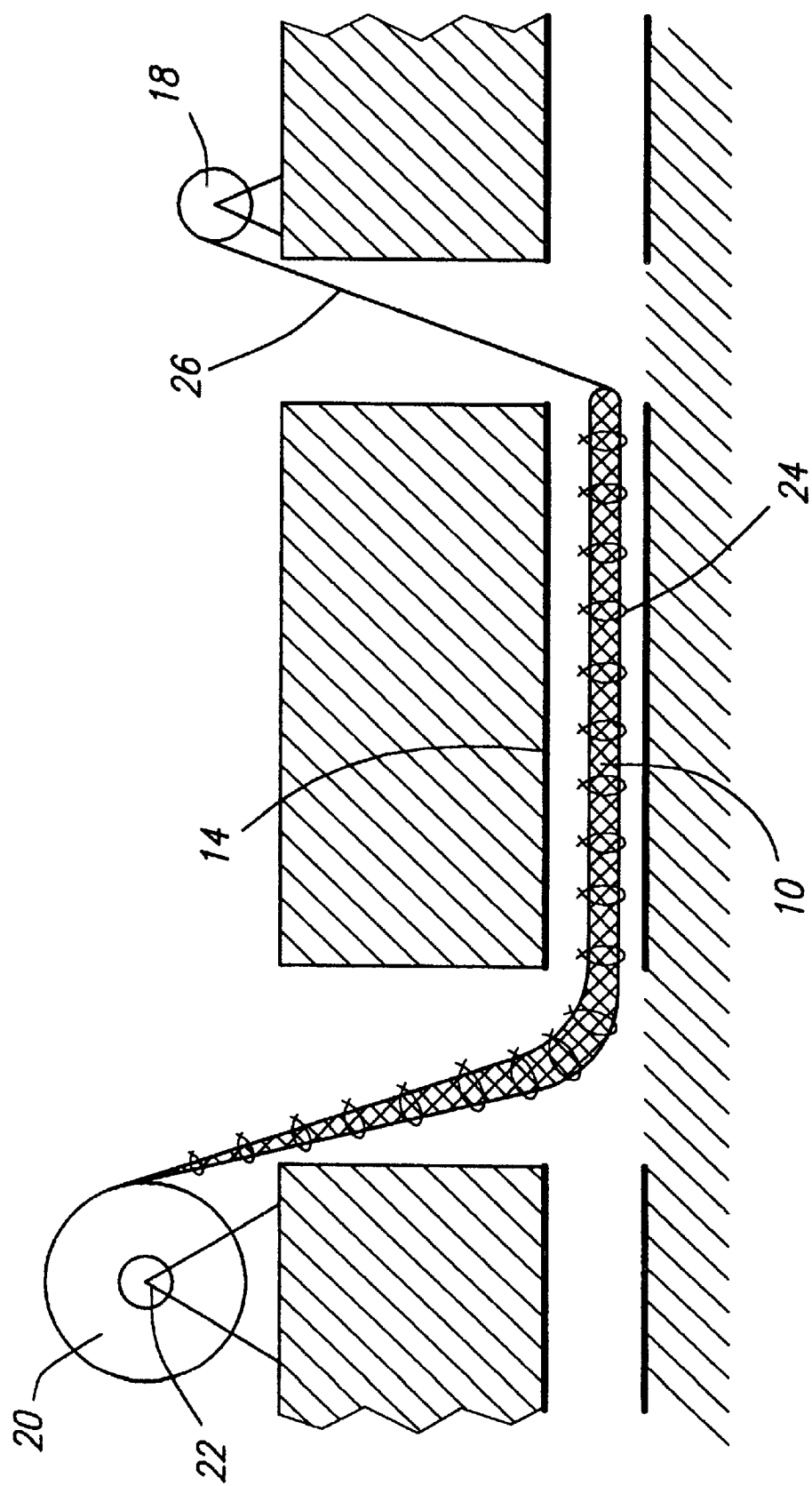
FIG. 3 is a schematic illustration of the insertion of the liner into a host pipe.

To install the liner, a liner tube 10 is winched or hauled into place by a winch 18 through the host pipe 14 from a supply reel 20 pivotally mounted at 22 as shown in FIG. 3. A number of straps are provided around the cross-section of the liner to ensure that the liner maintains its folded condition thus facilitating substantially unhindered induction thereof into and through the pipe 14. The front end of the liner may be attached to a tow string 26 as shown.

Figure 4:
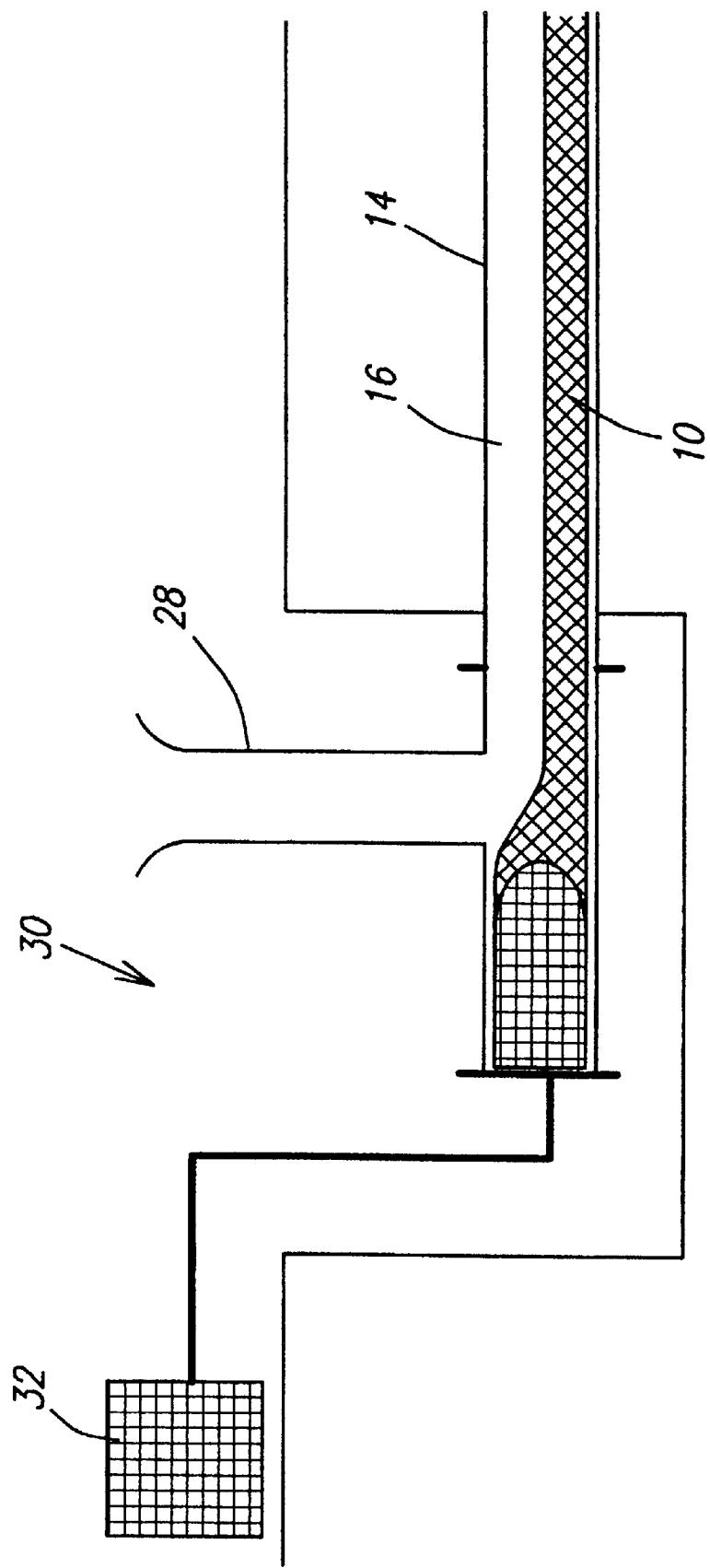
FIG. 4 is a schematic illustration of the start installation fitting required for installation of the liner and cement mortar.

As can be seen from FIG. 4, the pipe is precharged with a slug of cement 16 from a charging hopper 28 which is provided as part of a start installation fitting 30 which also includes a water or air supply 32 which is pressure controlled. The fitting 30 is also provided with a reforming device 34 which is inserted into an open end of the liner to flare same and ensure the correct inflation of the liner occurs within the pipe 14. Once the measured quantity of cement has been deposited in the pipe, the liner is sealed at both ends and the fluid and/or air pressure connections are made. Progressive expansion of the liner occurs as the reforming device is propelled along the pipe 14 and within the liner 10 under water or fluid pressure provided by the supply 32. Such expansion of the liner is shown clearly in FIG. 5. An end installation fitting 40 is provided with an exit chute 42 via which excess cement can escape at the end of the portion of the pipe 14 which is to be lined. It will be seen from this figure that a new liner for the pipe is created with the cement 16 in close contact with the inner wall of the pipeline 14 and the thermoplastic liner 10 permanently locked into position by means of the integral anchor hooks 12. The cement provides active corrosion protection of the host pipe if of steel while the tubular liner adds a polymeric barrier to prevent the ingress of water and leaching of lime.

The use of cement mortar prevents corrosion by providing a highly alkaline environment (pH approx. 12.5) in which an iron oxide film develops and remains stable beneath the lining. The steel is thus described as being passivated. This passivated zone consists of a discontinuous polycrystalline layer of Portlandite $Ca(OH)_2$ of variable thickness and coarse grain size containing inclusions of C-S-H gel. The composite polymeric barrier and cement structure will also prevent leakage.

By using either water or air or a combination of both to achieve the correct installation pressure head, the thermoplastic liner can be re-rounded inside a host pipe which has been cleaned to similar standard to that required for traditional cement mortar lining. As the reforming face of the liner pushes against a predetermined volume of cement mortar, the cement is distributed against the internal walls of the host pipe with a proportion of the cement mortar also flowing between the anchor hooks to create interfacial adhesion between the thermoplastic liner and the cement. The thermoplastic liner remains fully inflated during hydration of the cement, maintaining both the cement and the thermoplastic liner in position. No external heat sources such as hot water, steam, etc are required as hydration occurs in ambient conditions. It is to be noted that while cement morar is the preferred bonding medium, any synthetic resin or adhesive such as polyester, polyurethane, epoxy etc. may be used in place of the cement, but in such circumstances external heating may be require to promote cure.

Figure 5:
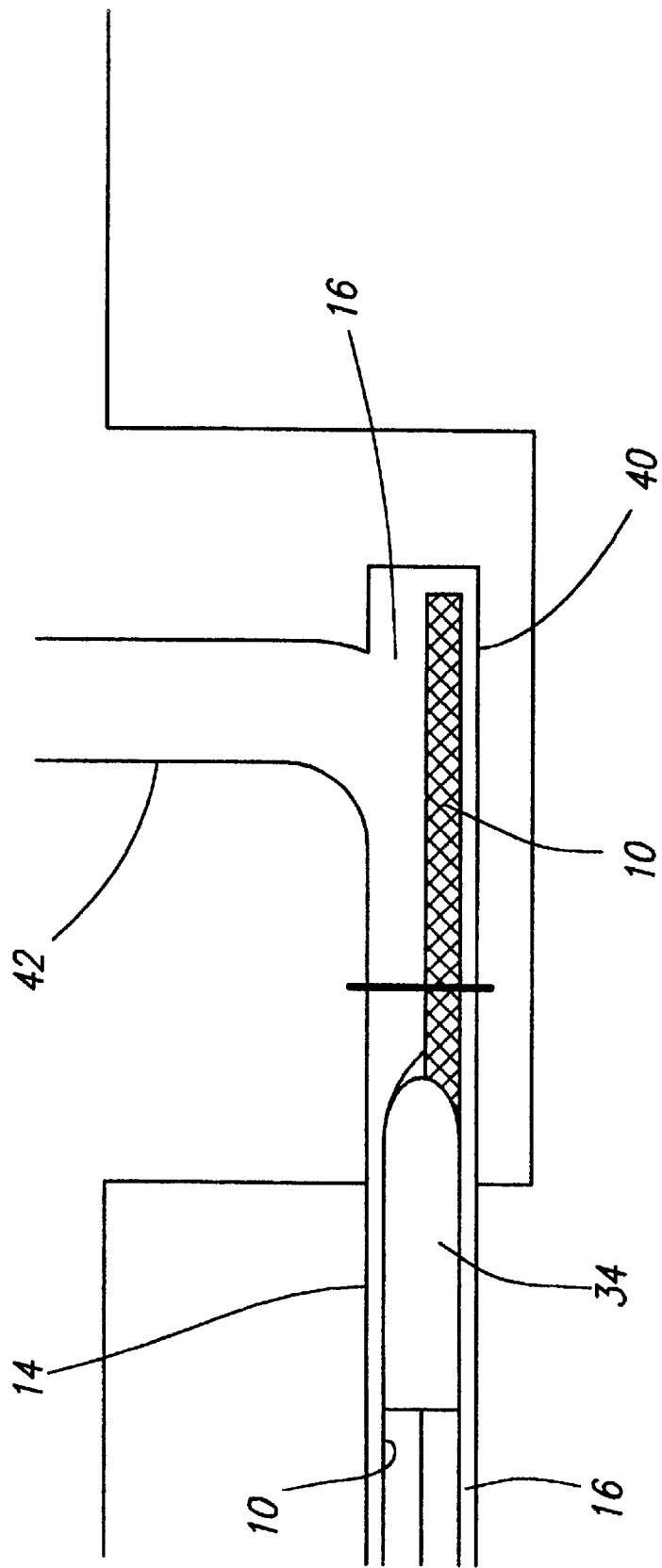
FIG. 5 is a schematic illustration of the end installation fitting required for installation of the liner and cement mortar.

Progressive re-rounding of the liner tube is normally achieved by the use of a parachute-style rounding device, such as the reforming device 34 shown in FIG. 5. Alternatively a calibration hose which is inverted using conventional inversion techniques or a combination of both may also be used depending on site circumstances.

Figure 6:
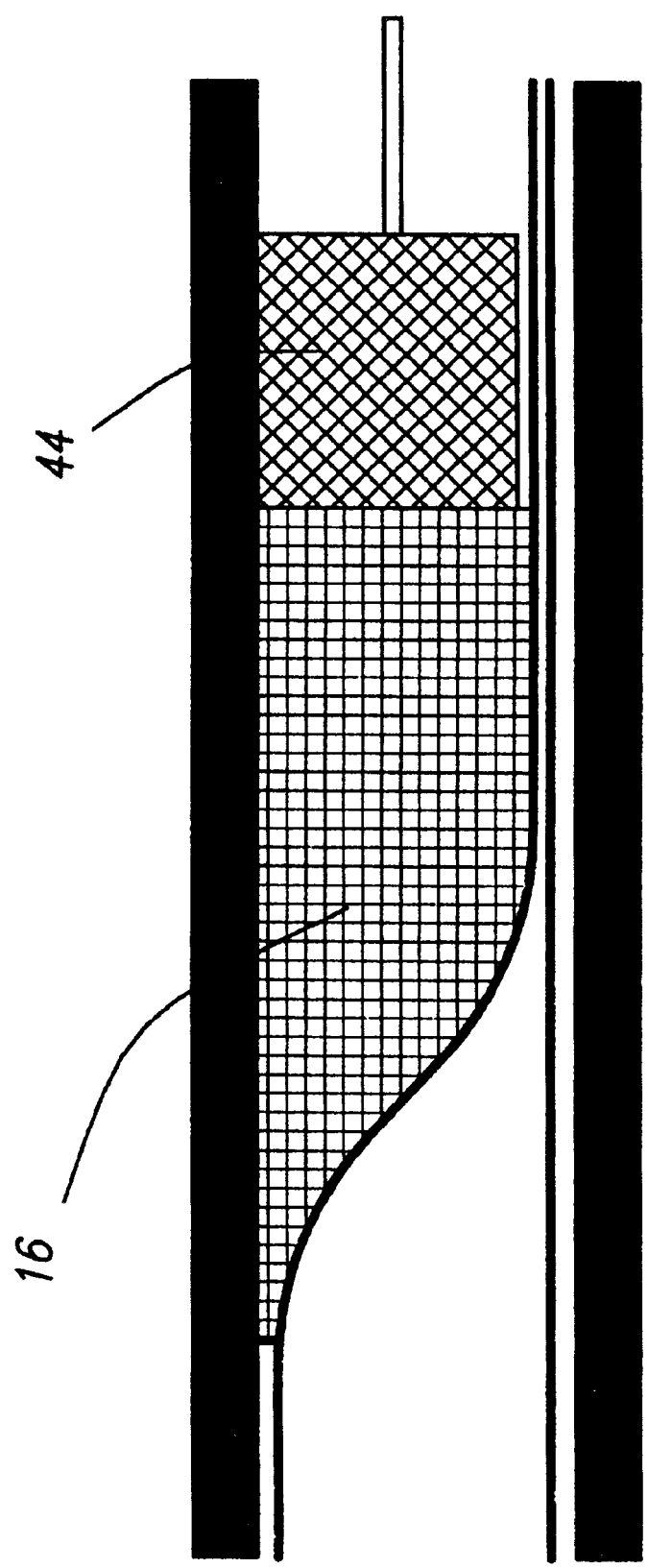
FIG. 6 is a schematic illustration of the method according to the present invention for inflating the folded thermoplastic liner to a round and generally cylindrical configuration and simultaneous displacement of the fluent curable compound, including a schematic representation of fluid restraining moveable plug.

The general sequence of events for lining are as follows:

1. Access openings to pipe exposing both ends of the pipe to be lined; one opening required at each end of the lining run possibly provided at T-junctions or valves;
2. Clean lining run and remove all debris, loose scale and standing water; once cleaned, the pipe is inspected for unrestricted bore so that the thermoplastic liner will be unimpeded during installation;
3. The thermoplastic liners arrive at the site in coils; a check is performed to ensure a sufficient length of liner for the lining operation; it is believed that 300 m is the maximum possible lining length in a single run, but in special circumstances this may be extended to 1 km; the host pipe material may be steel, ductile iron, cast iron, plastic, asbestos, cement or concrete; The diameter of the thermoplastic liner is checked against the dimensions of the host pipe, and then winched into position within the host pipe; A back pressure PIG such as that shown in FIG. 6 at 44 may be required depending on site circumstances and this would be installed from one end of the thermoplastic liner up to a point to which the mortar slug extends before re-rounding of the liner occurs;
4. A measured volume of cement mortar is mixed and pump or otherwise deposited in the void above the folded and installed liner for a distance determined by the volume of mortar to be used;
5. If required, any entrained air is released by means of a bleed device such as a short length of plastic pipe; this bleed device would be removed at the start of the re-rounding process;
6. Attach and hermetically seal the thermoplastic tube to the parachute launch fitting and the end installation fitting, attaching the necessary air hoses and installation pressure control devices;
7. Launch the parachute-type reforming device 34 through the thermoplastic liner using compressed air or water to propel it and while doing so, monitor the advance of the liner and control the rerounding pressures; At this point the tape or strapping ties maintaining the thermoplastic liner in its folded condition will break allowing the liner to reform into its original cylindical condition; re-rounding pressure is approx. 0.8–1 bar compressed air depending upon the diameter of the pipe, number of bends, etc., but this can vary substantially depending on circumstances; As the liner progressively re-rounds it is pressed against the cement slug which both evenly distributes itself around the liner and itself progressively moves along the pipe until the reforming device reaches the stop end; Air ventilation needles, if required, are installed at the stop-end by piercing through an exposed section of the liner thereat;
8. With the liner fully expanded to its original cylindrical shape, allow the cement to hydrate and carry out checks on the systems' impermeability by monitoring any head loss during hydration; The cement mortar and the thermoplastic liner is held in position under pressure until hydration has taken place and the entire system has become self supporting;

9. After hydration, trim ends and inspect liner; The pipe ends are cut clean and then end sealing is checked; spool pieces are replaced and the lateral service connections reinstated.

The installation procedure described herein is a general description and it shall be appreciated that the process can be designed to obtain desired results such as where over expansion, no expansion and/or smooth transitional shapes are required. It will be appreciated that field installation conditions vary and that the exactly repeated installation procedure may be purely coincidental.

While the invention has been described in connection with what is presently considered to be the most practical and preferred embodiment, it is to be understood that the invention is not limited to the disclosed embodiment, but on the contrary, is intended to cover various modifications and equivalent arrangements with processing variables such as manufacturing and coiling options, extent of sizes beyond specified and alternatives to cement mortar such as thermo-setting resins, included within the scope and spirit of the appended claims.

What is claimed is:

1. A method of lining a host pipeline or passageway or the like, comprising the steps of
    drawing into a portion of said pipeline a tubular liner of sufficient length to line said portion;
    depositing a slug of a fluent hardenable compound in the host pipeline externally of the liner,
    expanding the liner within the pipeline against the inner surface of said pipeline progressively along the length of said lines thus causing the slug of fluent hardenable compound to flow between the outer surface of the liner and the inner surface of the pipeline and progressively along the pipe wherein the outer surface of the liner is provided with a plurality of protrusions spaced axially and radially on at least one surface of the liner which allows for flow of the hardenable compound around said liner which forms a mechanical bond with said liner when the compound cures.

2. A method according to claim 1 characterised in that the outer surface of the liner is provided with a plurality of protrusions which penetrate the curable hardenable compound as it flows therearound to form a mechanical bond therebetween when the compound cures.

3. A method according to claim 1 characterised in that the liner is drawn into the pipeline in folded form.

4. A method according to claim 1 characterised in that the fluent hardenable compound is a cementitious mortar.

5. A method according to claim 1 characterised in that the liner is formed from a polymer material.

6. A method according to claim 1 characterised in that the liner is provided with a plurality of upturned anchor formations joined at their single end to the outer surface of the liner and having their split or double end standing free and proud above the said liner outer surface.

7. A method according to claim 1 characterised in that the protrusions are substantially uniformly distributed over the outer surface of the liner and provided thereon in a concentration which substantially prevents the natural gravitational slump of fluent hardenable compound which naturally occurs before hardening thereof.

8. A method according to claim 1, wherein the lining of the pipeline is effected in a trenchless manner.

9. A liner for lining a host pipeline, said liner being of a flexible plastics or polymer material and in tubular form, wherein the outer surface of the liner is provided with a plurality of protrusions spaced axially and radially of the liner around and within which a fluent hardenable compound can flow as the liner is expanded within the pipe so as to create a bond between the liner and the pipe.

10. A liner according to claim 9 wherein the liner is tubularly formed by spiral winding of strips of liner material around a former and subsequent sealing of the seams between adjacent liner strips.

11. A method of line a host pipeline or passageway or the like, comprising the steps of:
    providing in a portion of said pipeline a tubular liner of sufficient length to line said portion, the liner being provided with a plurality of protrusions spaced axially and radially on the outer surface of the liner;
    depositing a fluent hardenable compound and allowing for substantially unimpeded radial flow thereof to form a mechanical bond between the liner and the pipeline when the compound hardens.

12. A method according to claim 11 wherein the liner is drawn in the pipeline in folded form.

13. A method according to claim 11 wherein the fluent hardenable compound is a cementitious mortar.

14. A method according to claim 11 wherein the liner is formed from a polymer material.

15. A method according to claim 11 wherein the protrusions are substantially uniformly distributed over the outer surface of the liner and provided thereon in a concentration which substantially prevents gravitational slump of the fluent hardenable compound.

16. A method according to claim 11 wherein the lining of the pipeline is effected in a trenchless manner.

17. A method according to claim 6 wherein the formations are substantially uniformly distributed over the outer surface of the liner and provided thereon in a concentration which substantially prevents the natural gravitational slump of fluent hardenable compound which naturally occurs before hardening thereof.

* * * * *